United States Patent [19]

Zeise

[11] Patent Number: 5,111,217
[45] Date of Patent: May 5, 1992

[54] DOT PRINTER AND METHOD FOR GREY LEVEL RECORDING

[75] Inventor: Eric K. Zeise, Pittsford, N.Y.

[73] Assignee: Eastman Kodak Company, Rochester, N.Y.

[21] Appl. No.: 451,898

[22] Filed: Dec. 18, 1989

[51] Int. Cl.$^5$ .................... G01D 15/14; H04N 1/036; H04N 1/23

[52] U.S. Cl. ................... 346/107 R; 358/298

[58] Field of Search .................. 346/107 R, 160, 154, 346/1.1, 108; 364/519; 358/298

[56] References Cited

U.S. PATENT DOCUMENTS

| | | |
|---|---|---|
| 3,850,517 | 11/1974 | Stephany et al. |
| 4,712,116 | 12/1987 | Reinten ............................. 346/107 R |
| 4,746,941 | 5/1988 | Pham et al. ......................... 364/519 |
| 4,750,010 | 6/1988 | Ayers et al. ...................... 346/107 R |
| 4,799,071 | 1/1989 | Zeise et al. ............................ 346/16 |
| 4,821,066 | 4/1989 | Foote, Jr. et al. ................... 346/157 |
| 4,831,395 | 5/1989 | Pham et al. ......................... 346/160 |
| 4,885,597 | 12/1989 | Tschang et al. ..................... 364/519 |
| 4,918,462 | 4/1990 | Tomita et al. .................. 346/107 R |
| 4,926,248 | 5/1990 | Kobayashi et al. ................. 358/298 |
| 4,987,426 | 1/1991 | Ota et al. ............................. 346/108 |

FOREIGN PATENT DOCUMENTS

| | | |
|---|---|---|
| 188023 | 7/1986 | European Pat. Off. . |
| 204094 | 12/1986 | European Pat. Off. . |
| 213891 | 3/1987 | European Pat. Off. . |

OTHER PUBLICATIONS

Proceedings of the SID, vol. 21, No. 2, 1980 pp. 171-175; Nakaya et al, "Gray Scale Thermal Recording".

Primary Examiner—Benjamin R. Fuller
Assistant Examiner—David Yockey
Attorney, Agent, or Firm—Norman Rushefsky

[57] ABSTRACT

A non-impact dot printer such as an LED printer, records grey levels of each dot by pulse width modulating the exposure on-time for each LED. The on-time of each LED for each exposure is controlled by comparing a count, representing an exposure time with a time changing output of two counters. The improved printer and method of printing employs two counters that are counting at slightly different clock rates (or at the same rates but the counts change at slightly different times). A multiplexer associated with the comparator selects which counters output is to be compared with the comparator. A particular LED may be selectively illuminated for a picture element time period determined either solely by one or the other of the counters, or by the count of one counter and the count of the other. Because of the small difference between the clock rates used to change the outputs of the counter, uniformity control of the LED's can be significantly improved by allowing fine control of LED on time.

18 Claims, 3 Drawing Sheets

DOT PRINTER AND METHOD FOR GREY LEVEL RECORDING

CROSS REFERENCE TO RELATED APPLICATIONS

This application is related to U.S. application Ser. No. 07/290,002, filed Dec. 27, 1988 in the name of Pham et al and the following U.S. applications filed on even date herewith:

1. Application Ser. No. 07/451,907 filed in the name of Roger Morton and entitled, "Method and Apparatus for Grey Level Printing with Amplitude and Pulse-Width Modulation"

2. Application Ser. No. 07/453,421 filed in the name of Yee S. Ng and entitled, "Method and Apparatus for Grey Level Recording Using Multiple Addressability"

3. Application Ser. No. 07/453,422 filed in the name of Roger Morton and entitled, "Method and Apparatus for Grey Level Printing."

BACKGROUND OF THE INVENTION

1. Field of the Invention

The present invention relates to a non-impact dot printer for printing halftone or continuous tone information and the like with small pixels (dots).

2. Description of the Prior Art

Various non-impact recording or printer heads for use as dot printers are known. Examples of such heads include an electrostatic printer head, an LED (light emitting diode) array printer head, ink-jet printer head, thermal printer head, etc. While the invention will find utility with regard to non-impact printers in general, discussion will be made herein with regard to LED printer heads with which the invention is particularly suited.

In U.S. application Ser. No. 07/290,002, the contents of which are incorporated herein by this reference, an LED printer is described in which a series of LED's arranged in a straight line are selectively activatable for brief periods to form dot-like images on a recording surface. In the printer described in this patent, grey scale recording is achieved by having a digital comparator associated with each LED. At one input to the comparator, there is provided the data in the form of a plurality of digital data bits representing an exposure on-time for that LED for that PEL (picture element) period. At a second input to the comparator, an input is from an up/down counter is provided that is rapidly changing in accordance with signals emitted from a high speed clock. As the counter output value decreases towards zero at some point in time a match is sensed by the comparator between the two inputs of the comparator (in accordance with its operating criterion). The LED then turns on and remains on for a very brief duration until a subsequent sensing of a match by the comparator occurs during a count-up phase of the counter. In the above noted application "exposure space" is enhanced by providing a programmable clock whose periodicity changes within the counting cycle. The gradations of exposure provided are more realistically related to human visual perception. The above application also notes that the data may be adjusted to provide also for exposure balancing of the LED's. This is desirable where non-uniformity in illumination from LED to LED on the printer head may be expected.

A problem with the above is that it does not provide for uniformity correction to the extent that may sometimes be required for particularly high quality continuous tone or halftone printing.

It is an object of this invention, therefore, to overcome the deficiencies of this prior art.

SUMMARY OF THE INVENTION

The present invention is directed to a non-impact printer apparatus and methods for recording with a recording element wherein means are provided for driving the recording element for printing. The enablement time of driving the recording element during a picture element recording period is controlled by a multibit register means for storing a multibit data signal to be printed. Two or more concurrent series of digital pulse signals are generated. Each series of pulse signals includes a multibit digital signal representing a time-changing count, the time-changing count of one series changing at a different rate (or at the same rate but at different times) than the time-changing count of the other series. A comparator compares a multibit data signal with one of said counts and enables the driving means at a time controlled by said multibit data signal and said count of one series and disenables said driving means at a time controlled by the same or a different multibit data signal and the count of the other series.

DESCRIPTION OF THE DRAWINGS

In the detailed description of the preferred embodiments of the invention presented below, reference is made of the accompanying drawings in which.

DESCRIPTION OF THE PREFERRED EMBODIMENTS

Because apparatus of the type described herein are well known, the present description will be directed in particular to elements forming part of, or cooperating more directly with, the present invention.

Figure 1:
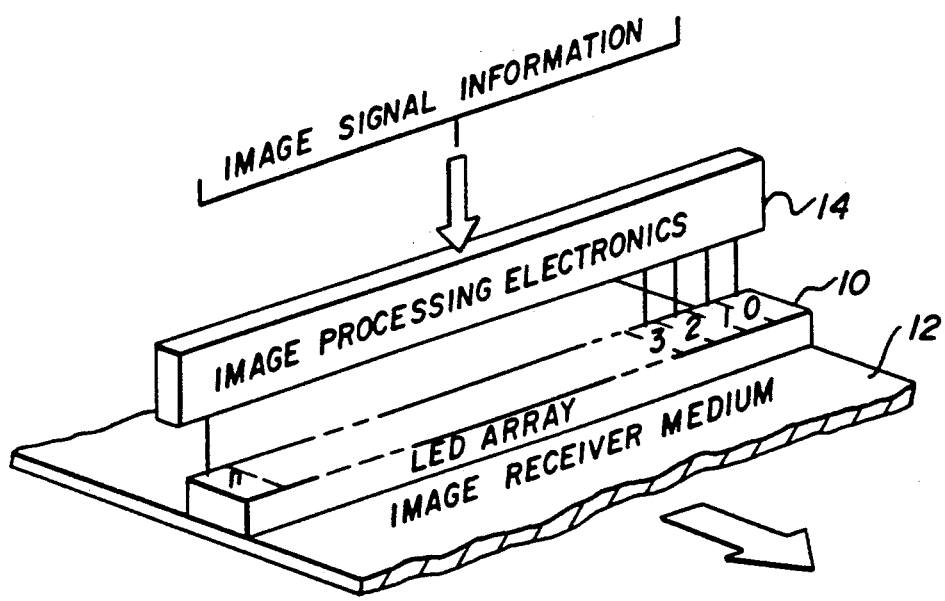
FIG. 1 is a perspective view illustrating the general arrangement of a non-impact printer as used in the embodiment of the invention and as known in the prior art.

The apparatus for the herein disclosed invention is typified by the diagram of FIG. 1: a linear array 10 of say 3584 triggerable recording elements or radiation sources; e.g. LED's, is disposed to expose selectively a photosensitive image-receiver medium 12 that is movable relative to the array by suitable conventional means (not shown). Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LED's may be subsequently developed by conventional means to form a visible image. Where the medium 12 is an electrophotographic receptor, the LED's may be used to form an electrostatic image on a uniformly electrostatically charged photoconductor and this image developed using colored toner particles and perhaps transferred to a copy sheet, see U.S. Pat. No. 3,850,517, the contents of which are incorporated herein.

Figure 2:
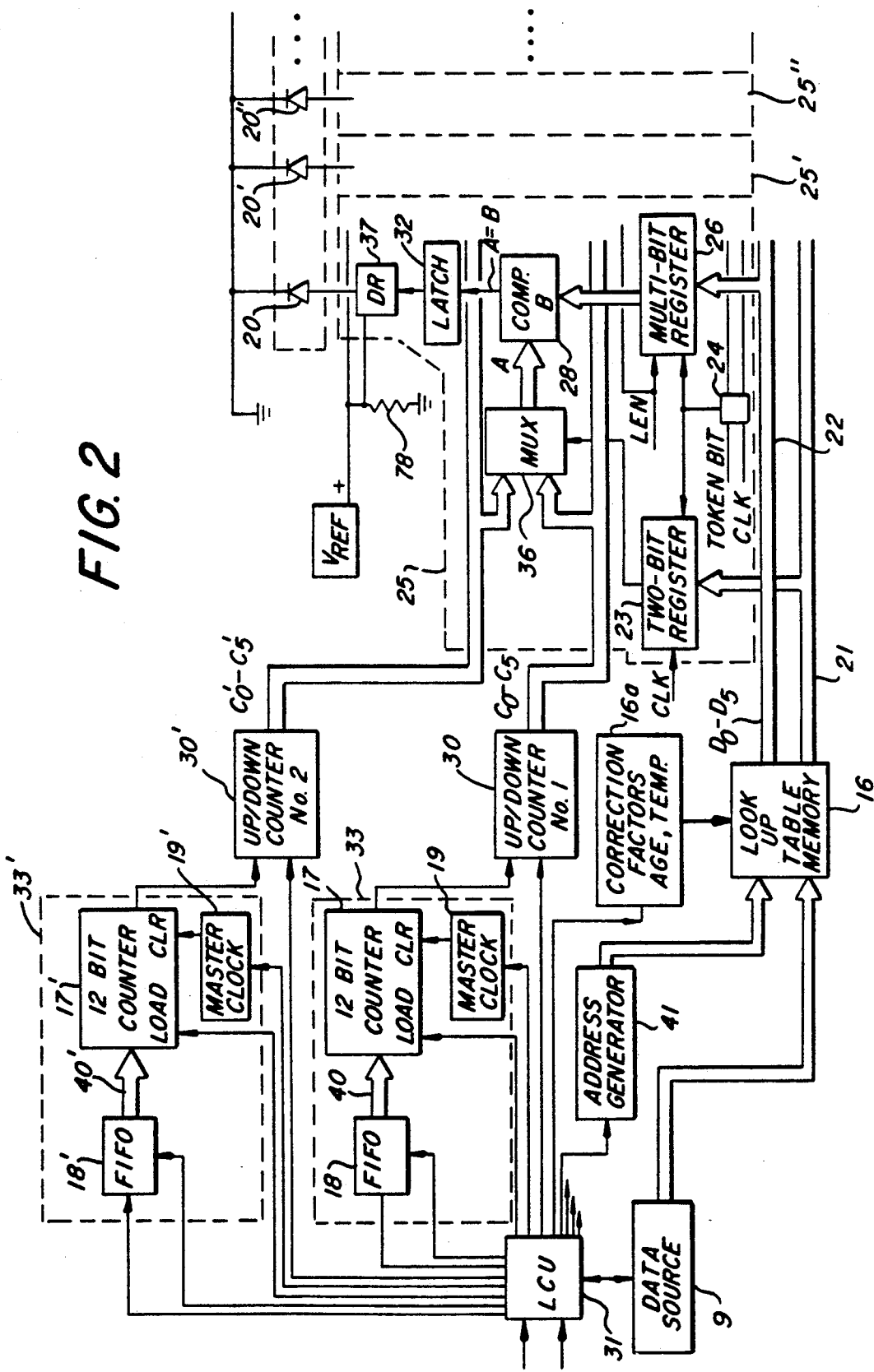
FIG. 2 is a schematic of a printer circuit for recording grey scale information in accordance with the invention.

With reference now to FIG. 2, a circuit is shown which may be used for triggering selectively the LED's 20, 20', 20'', etc. that together comprise the array 10. Only the associated driver circuitry for driving one LED is shown for clarity purposes, it being understood that the circuitry for driving such other LED's is similar to that described for the illustrated examples. While the figure shows all the driver circuitry associated with the LED's located to one side of the line of LED's, it is well known to place these circuits on both sides of the line of LED's to provide more efficient utilization of space.

Data to be printed for each line is in the form of binary digital signals, e.g., 1's and 0's. This data on lines labeled $D_0$-$D_5$ are outputted in parallel onto the data bus 22 from a look-up table memory 16. The inputs to the table memory 16 comprise a 4-bit uncorrected data signal from a data source 9 and a signal from an address generator 41 identifying an address in table memory 16 where the correction characteristics are stored of the particular LED to print that data signal. The data on lines $D_0$-$D_5$ comprises, in this example, a corrected six-bit data signal representing an exposure time count for a particular LED for printing a single grey level recorded dot. Synchronously with the generation of each six-bit data signal, there is also generated by the look-up table memory 16 a two-bit signal on bus 21 identifying the counter or counters to which the exposure time count is to be compared. This two-bit signal is accessible to a two-bit register 232 associated with each LED. There is also synchronously generated with these signals by the logic and control unit (LCU) 31 a token bit signal which is a single-bit binary signal that is shifted down a shift register formed by a plurality of individual registers 24. Each such register 24 is associated with a particular LED as is all the circuit structure illustrated as being enclosed within the enclosed area defined by dotted line 25. The enclosed areas defined by dotted lines 25', 25'' represent identical structure to that illustrated in enclosed area 25. This token bit determines to which of the LED's a particular set of data on bus 22 and two-bit signal on bus 21 are intended. In operation, a series of six-bit data signals are provided on bus 22 and one six-bit signal is latched by each of the 3584 multibit registers 26 associated with each LED. The latching being in response to the presence of the token bit in the particular register 24. Similarly, a respective two-bit signal is generated for each six-bit signal and the token bit determines which of the two-bit registers associated with each LED is to latch this two-bit signal. Further description relative to a circuit for selectively latching data of this type is provided in U.S. Pat. No. 4,746,941, entitled "Dot Printer With Token Bit Selection of Data Latching," the contents of which are incorporated herein by this reference. After a six-bit data signal is stored in each of the multi-bit registers 26 and a two-bit signal latched in register 23, a latch enable (LEN) signal is provided by the LCU 31 to shift this six-bit signal to an output stage or latch of each register so that a six-bit level data signal (say decimal 10 for LED 20 for this particular PEL period) is output to one input terminal (B) of a respective digital comparator 28 associated with each LED. At this point in time digital counters 30 and 30' are enabled by LCU 31 to count down, in this example, form decimal 63 ($2^6-1$) to 0. The output of each of the counters 30, 30' are six-bit signals, in this example, $C_0$-$C_5$ and $C'_0$-$C'_5$ represent in digital form numbers or counts which change periodically in accordance with clock pulses from respective programmable clocks 33 and 33'. With each pulse (or trailing edge of same) from clocks 33 and 33', the respective counters change their counts at their outputs. The outputs of counters 30 and 30' are input into a multiplexer 36 which is associated with each LED. The multiplexer determines which of the two-clock counts are input to the input terminal (A) of the digital comparator 28. The selection by the multiplexer of the particular counter is controlled by a one-bit signal from the two-bit register 23. The signals stored in the two-bit register 23 represent a one-bit selection signal for the count-down phase of the counters and a second one-bit selection signal for the count-up mode or phase of the counters 30, 30'. In the following example, assume that the counter 30 is to be selected during the count-down mode and that counter 30' is to be selected during the count-up mode of the counters. Thus, the comparator 28 for each LED now compares the signals at its respective A and B inputs in accordance with the comparator's criteria for operation, i.e., is A equal B? During the count-down mode of the counters when the count output by the counter 30 and inputted at terminal A is equal to a respective input data signal at terminal B (decimal 10, for example, but can be any number between 1 and 63), the output of a respective comparator goes to a digital logic high level and is latched at a respective latch register 32. The latched signal allows driver 37 to be enabled, at the rising edge of the next clock pulse from programmable or variable clock 33, to commence and maintain current respectively to LED 20. After each counter 30, 30' counts down to zero at their respective rates, the counters 30 and 30' are either reset by the next clock pulse into a count-up mode or inhibited from counting additional clock pulses for a minimum respective period $T_{MIN}$ that is programmed into each counter or provided by other suitable means. In one embodiment, the duration of $T_{MIN}$ may be from a count of "1" in the down counting mode to a count of "1" in the up counting mode. After this predetermined time period $T_{MIN}$, the counters are set to count in their count-up modes and commence counting clock pulses again. A clock pulse from the LCU has previously shifted the next data bit from the two-bit register 23 to provide a new signal to the multiplexer 36 to pass the count of up/down counter 30' to input terminal A of the comparator. When the output of counter 30' in its count-up mode reaches say decimal 10 or some other number stored in the terminal B of comparator 28 and meeting an appropriate criterion for comparison, the output of comparator 28 changes and the latch 32 is reset and current to the LED 20 ceases. The other LED's 20 operate in similar fashion but their data will require different count values to turn on and off in accordance with grey scale data provided in their respective multi-bit registers and respective counters selected. In this embodiment the LED's may be initially "balanced" such as by adjusting a "trim" resistor 78 associated with each driver chip, see U.S. Pat. No. 4,831,395, the contents of which are incorporated herein by this reference. Other known techniques for balancing output of the recording elements may also be provided. See, for example, U.S. application Ser. No. 07/290,012, filed Dec. 27, 1988 in the names of Pin Tschang et al and now U.S. Pat. No. 4,885,597. In addition, further balancing or correction for unequal light output is provided by adjustment of the data in accordance with the characteristics of each LED. Thus, the memory device such as a programmable read-only memory device or PROM stores the characteristics of each LED and data for that LED can be modified to provide an input count at terminal B that represents data modified by the exposure characteristics of the LED. For example, for an LED that is a relatively strong light emitter the PROM would modify data bits for that LED to reduce the count that otherwise would be provided at terminal B based solely on the data.

While in the preferred embodiment the clocks are employed are programmable clocks as described below and in aforementioned U.S. application Ser. No. 07/290,002 the invention in its broader aspects is not so limited. Where the clocks 33, 33' are clocks having regular periodicity they may vary by say 0.25% as would be the case where master clock 33 is a 40 MHz clock and master clock 33' is a 40.1 MHz clock, very fine control of on-time is available. Assume, for example, that for a data signal calling for a count of 10 down and 10 up the following combinations are available: #1. A count of 10 down using counter 30, a count of 10 up using counter 30'. #2. A count of 10 down using counter 30, a count of 10 up using counter 30. #3. A count of 10 down using counter 30' and a count of 10 up using counter 30'. Where the periodicity of the programmable clocks 33, 33' are different for count-down and count-up #4. A count of 10 down using counter 30', a count of 10 up using counter 30.

Description will now be provided relative to the circuits 33 and 33' for generating clock pulses that change with a varying periodicity. Each memory device, such as a first-in, first-out (FIFO) memory 18, 18' is loaded in this example with a respective 12-bit number that is provided, for example, by a serial signal from LCU 31. These respective 12-bit numbers are output in parallel over lines 40, 40' from the FIFO's 18, 18' and input to a respective 12-bit counter 17, 17' that includes a comparator means. At the beginning of a PEL period (picture element period) each of these counters are reset by a respective signal from LCU 31 and in response to a synchronizing signal from LCU 31 commence to count clock pulses from respective master clock 19, 19'. Upon reaching the respective 12-bit count provided at its input, the counters 17, 17' each emit a single pulse and reset itself to repeat this operation. Alternatively, the counter may be preset to the 12-bit count that is input thereto and count down to zero and emit a single pulse. As long as the 12-bit number at its input remains unchanged each counter 17, 17' will emit a series of pulses equally spaced in time. The output of each counter 17, 17' comprises the output of the elements defined as the respective variable clock 33, 33'. The output of each clock 33, 33' are groups of serial clock pulses wherein, for this example, in each group the respective pulses are uniformly spaced. The spacing between clock pulses is directly related to the respective 12-bit number or clock coefficient output 40, 40' from FIFO memory device 18. As one example, each FIFO memory 18, 18' may have input thereto, from LCU 31, 127 clock coefficients. The 127 coefficients to be input to FIFO, memory 18 may be the same as that input to FIFO memory 18'. In such case FIFO memory 18' is unnecessary and the signal 40 is loaded into both 12-bit counters 17, 17'. As the clock pulses $C_0$–$C_5$ may be created with groups of uniformly spaced pulses, some of the coefficients are the same so that after counting to the 12-bit number and emitting a single variable clock pulse the counter 33 receives the next 12-bit number which may be the same as the previous 12-bit number. These 12-bit numbers thus establish the periodicity of the pulses from counters 30, 30' and thus allow for clock pulses that change nonlinearly with time.

In the discussion provided above, it was noted that the data source 9 provided data information having 4 bits per pixel while the data passed along to data bus $D_0$–$D_5$ was 6 bits per pixel. As may be noted in FIG. 2, the data sources output is input to a lookup table memory device 16 along with an address provided by the address generator 41. The address generator points to the location in memory device 16 thereof where data is stored for each particular LED. Thus, a table of memory is provided for each LED and indicates for this LED a corresponding exposure time for each grey level it is to print. It is this exposure time which is a six-bit digital number that is output as data onto data bus $D_0$–$D_5$.

While the six-bit per pixel signal ($D_0$–$D_5$) represents exposure information corrected for nonuniformities of the LED's, it is recognized that during use of the printhead nonuniformities arise due to different aging of the LED's or due to differences in temperature. Aging differences are created when some LED's are used more than others during the course of different print jobs. In U.S. Pat. No. 4,799,071, it is proposed to minimize aging differences by activating underused LED's during periods of non-use of the printer for printing a print job or otherwise correcting for non-uniformities based on differences in aging as the printhead is being used. Thus, factors such as those based on environmental considerations and/or usage may be accommodated by providing updated entries automatically from a correction calculator 16a to look-up table memory 16.

Also, the data signal $D_0$–$D_5$ may be a different number for count down than for count-up. This may be accomplished by sending out a 12-bit data signal prior to each PEL period with 6 bits used for countdown and 6 bits used for count-up or 6 bits may be shifted prior to the PEL period and 6 bits shifted during a $T_{MIN}$ period between count-down and count-up. The up-down counter may be replaced with a unidirectional counter with suitable means provided to determine when to start and stop counting. In this regard, start and stop registers are provided to store respective counts.

Figure 3:
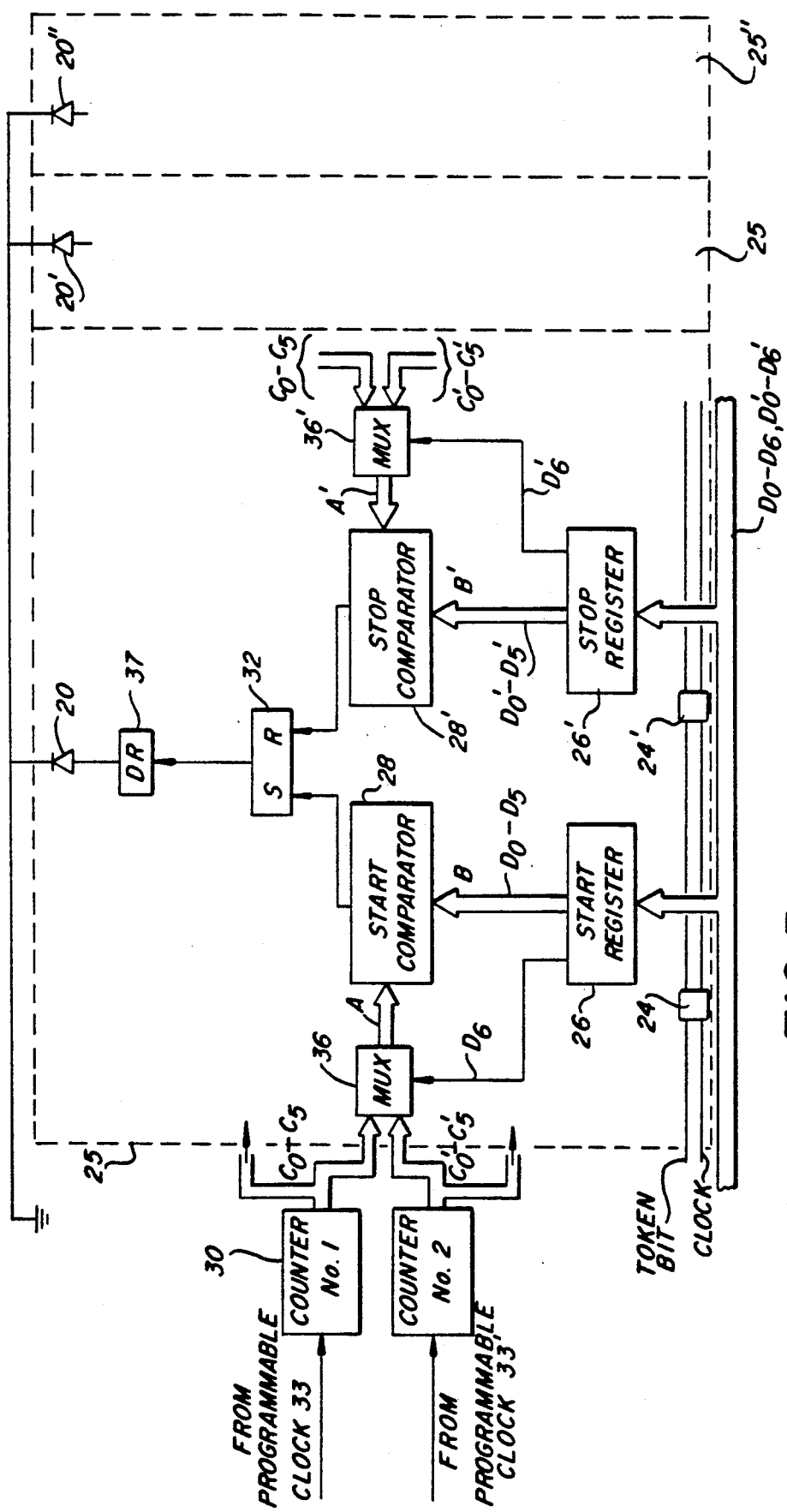
FIG. 3 is a schematic of an alternative printer circuit for recording grey scale information in accordance with the invention.

Reference will now be directed to the modified circuit of FIG. 3. In this circuit, a 7-bit data signal $D_0$–$D_6$ is transmitted along the common data bus. A token bit generated simultaneously with this data signal and passed along register 24, 24', etc. determines which multibit register 26, 26' etc. is to latch onto this data signal. In this embodiment, there are two multibit registers associated with each LED 20. As noted for FIG. 2, the structure illustrated on the enclosed area designated 25 is repeated for each LED 20, 20', 20''... as indicated by enclosed areas 25', 25'', etc. One multibit register, 26, is referred to as a start register, the other, 26', a stop register. The data associated with the stop register is designated $D'_0$–$D'_6$. Associated with each of these registers 26, 26', is a respective comparator 28, 28'. In this embodiment the extra data bit $D_6$, $D'_6$ is employed to control respective multiplexers 36, 36' as to which of the two counters 30, 30' are to be input to the input terminals A, A' of comparators 28, 28', respectively. Counters 30, 30' may be either bi-directional (e.g., down-up or up-down) or unidirectional (e.g., down or up). We will illustrate this embodiment with a down-counter example. They both commence simultaneously at a count of 63 and count to zero and are then reset. Their counts are controlled in response to respective clock pulses from clocks 33, 33' described previously and not illustrated in this figure. The purpose of the start comparator 28 is to compare an input data signal $D_0$-$D_5$ with a respective count from a clocked counter either 30 or 30' and when the criterion for comparison is met to set the latch 32 so that the current driver 37 is enabled and current flows to LED 20 to commence recording of a grey level pixel. The stop comparator 28' is responsive to a different data signal $D'_0$-$D'_5$ at its input at B'. The stop comparator 28' compares this input at B' with the count signal at its terminal A'. Again, the count signal is either $C_0$-$C_5$ or $C'_0$-$C'_5$ depending upon which counter 30, 30' is selected by multiplexer 36' in response to data signal $D'_6$. When the criterion for comparison is met, a signal from stop comparator 28' is emitted to reset latch 32. This signals driver 37 to cease current flow to LED 20 for that pixel.

The embodiment illustrated in FIG. 3 provides a vernier type of fine calibration to the control of on-time of each LED. In order to gain maximum advantage from this arrangement, the data signals can be selected so that on-times can be controlled to within very precise limits. For example, where one master clock 19 is a 40 MHz clock and the other master clock 19' is a 44 MHz clock, then control is provided that is one order of magnitude over that disclosed in the aforementioned U.S. Ser. No. 07/290,002. Substantially, finer control is provided where the two clocks have respective frequencies differing by even smaller amounts. Where selection of on-times provides the finest control, it may be found that the centering of pulses from respective LED's is no longer preserved. The loss of some resolution, however, is offset by significant improvement in uniformity control over the LED's.

While the master clocks 19 have been described as producing clock pulses at regular intervals which are counted by the 12-bit counter, it is contemplated that these master clocks will also be programmable so that while still emitting regular clock pulses, the time period between such regular clock pulses may be adjusted. Such adjustability may be provided by coupling the master clocks 19, 19' to the LCU so that either inputs by an operator or through automatic operation, signals from the LCU to the master clocks 19, 19' can adjust the period between master clock pulses, as may be needed for color printing or other process control such as contrast.

Thus, in color printing, for example, using well known electrophotographic reproduction apparatus, for example, see U.S. Pat. No. 4,821,066, the contents of which are incorporated herein by this reference, successive separate image frames on a photoconductor are exposed with color separation images to be developed, respectively, with cyan, magenta and yellow toners. The developed image frames are then transferred in register to a copy sheet. In modulating the electrostatic charge on each image frame with the printing apparatus described herein to form the color separation images the variability of master clock 19, 19' can prove useful. The clock pulse period from adjustable master clocks 19, 19' may be adjusted automatically for creating exposures on one color image frame, say cyan, to the next color image frame, say that for producing the magenta image. Adjustability of master clocks 19, 19' in combination with the variable programmable clock signals from programmable clocks 33, 33' provides for a very efficient and flexible control of exposure. In the example provided above for color reproduction, it is contemplated that the duration of each master clock pulse period used for printing one color separation image frame will differ by a few percent from that used in printing a different color separation image frame to provide the fine control for exposure time.

Still other modifications are possible, for example, in the embodiments described with reference to FIG. 2 in lieu of using two clocks 33, 33' having different frequencies, the clock may have the same frequency but offset by a constant interval. For example, where the frequency of clocks 33 and 33' are both 1 MHz one may be offset 0.333 $\mu$sec from the other. With such an arrangement, exposure times may be adjusted to within the duration of offset; i.e., one can achieve 10 $\mu$sec, 9.667 $\mu$sec or 10.333 $\mu$sec exposure times.

There has thus been described a method and apparatus for dot printing wherein a clocking scheme is employed for generating clocked exposure pulses for forming pixels that is capable of finer control of selectable exposure intervals throughout a range of exposure intervals.

The invention has been described in detail with particular reference to preferred embodiments thereof, but it will be understood that variations and modifications can be effected within the spirit and scope of the invention.

I claim:

1. A non-impact printer apparatus comprising:
   a recording element;
   driving means for driving the recording element for recording;
   control means for controlling an enablement time of the driving means for driving the recording element during a picture element recording period, said control means including a multibit register means for storing a multibit data signal representing data to be recorded;
   means for generating a first and a second concurrent series of digital pulse signals, each series of pulse signals including a multibit digital signal representing a time-changing count, a time-changing count of the first series changing at a different rate than a time-changing count of the second series;
   a comparator means for comparing a multibit data signal with one of said counts and enabling the driving means at a time controlled by said multibit data signal and said count of the first series of digital pulse signals and disenabling said driving means at a time controlled by a multibit data signal and the time-changing count of the second series of digital pulse signals.

2. The printer apparatus of claim 1 and including means for selecting which of the series of counts are input to the comparator means.

3. The printer apparatus of claim 1 or 2 and wherein there are a plurality of recording elements and the driving means drives one of said recording elements for a different duration for recording a picture element than another of said recording elements.

4. The printer apparatus of claim 3 and wherein the recording elements are light-emitting diodes.

5. A non-impact printer apparatus comprising:
a recording element;
driving means for driving the recording element for recording;
control means for controlling an enablement time of the driving means for driving the recording element during a picture element recording period, said control means including a multibit register means for storing a multibit data signal representing data to be recorded;
means for generating a first and a second concurrent series of digital pulse signals, each series of pulse signals including a multibit digital signal representing a time-changing count, a time-changing count of the first series changing at a rate that is equal to a rate of change of a time-changing count of the second series but changing at different times;
a comparator means for comparing a multibit data signal with one of said counts and enabling the driving means at a time controlled by said multibit data signal and said count of the first series of digital pulse signals and disenabling said driving means at a time controlled by a multibit data signal and the time-changing count of the second series of digital pulse signals.

6. The printer apparatus of claim 5 and including means for selecting which of the series of counts are input to the comparator means.

7. The printer apparatus of claim 5 or 6 and wherein there are a plurality of recording elements and the driving means drives one of said recording elements for a different duration for recording a picture element than another of said recording elements.

8. The printer apparatus of claim 7 and wherein the recording elements are light-emitting diodes.

9. A method of non-impact printing using a recording element, said method comprising the steps of:
moving a recording surface relative to the recording element;
generating a first and a second concurrent series of digital pulse signals, each series of pulse signals including a multibit digital signal representing a time-changing count, a time-changing count of the first series changing at a different rate than the time-changing count of the second series;
comparing a multibit data signal with one of said counts and enabling the recording element at a time controlled by said multibit data signal and said count of the first series of digital pulse signals and disenabling said recording element at a time controlled by a multibit data signal and the time-changing count of the second series of digital pulse signals to record a picture element upon said recording surface.

10. The method of claim 9 and wherein the recording element emits light when driven.

11. A method of non-impact printing using a recording element, said method comprising the steps of:
moving a recording surface relative to the recording element;
generating a first series and a second concurrent series of digital pulse signals, each series of pulse signals including a multibit digital signal representing a time-changing count, a time-changing count of the first series changing at a rate that is equal to a rate of change of a time-changing count of the second series, but changing at different times;
comparing a multibit data signal with one of said counts and enabling the recording element at a time controlled by said multibit data signal and said count of the first series of digital pulse signals and disenabling said recording element at a time controlled by a multibit data signal and the time-changing count of the second series of digital pulse signals to record a picture element upon said recording surface.

12. The method of claim 11 and wherein the recording element emits light when driven.

13. The printer apparatus of claim 1 or 5 and including means for altering a rate of changing of a count of at least one of the digital pulse signals in response to signals representing a color of an image being recorded.

14. The method of claim 9 or 11 and wherein a rate of changing of a count of at least one of the digital pulse signals is, during recording of a first picture element, different from the rate of changing of a count for said at least one of the digital pulse signals during recording of a different picture element that is to be recorded in a color that is different than a color that the first picture element is to be recorded in.

15. A non-impact printer apparatus comprising:
a plurality of recording elements arranged in a row;
driving means associated with each of said recording element for driving the recording element for recording;
control means for controlling respective enablement times of the driving means for driving respective recording elements during a period for recording a line of picture elements by said plurality of recording elements, said control means including a multibit register means associated respectively with each of said recording elements for storing a respective multibit data signal representing data to be recorded;
means for generating two concurrent series of digital pulse signals, each series of pulse signals including a multibit digital signal representing a time-changing count, a time-changing count of one series changing at a different rate than a time-changing count of another series;
a respective comparator means associated with each of said recording elements for comparing said multibit data signal with one of said counts and enabling a driving means associated with a respective recording element at a time controlled by said multibit data signal and said one of said counts represented by one series of digital pulse signals and disenabling said driving means associated with a respective recording element at a time controlled by a different multibit data signal and the time-changing count of another series of digital pulse signals; and
selection means associated with each respective comparator means for selecting, in response to a first selection signal, one of the two series of digital pulse signals to be used by a respective comparator means to compare said one of said counts for enabling of a said driving means associated with said respective recording element.

16. A non-impact printer apparatus comprising:
a plurality of recording elements arranged in a row;

driving means associated with each recording element for driving the recording elements for recording;

control means for controlling respective enablement times of the driving means for driving respective recording elements during a period for recording a line of picture elements by said plurality of recording elements, said control means including a multibit register means associated respectively with each recording element for storing a respective multibit data signal representing data to be recorded;

means for generating two concurrent series of digital pulse signals, each series of pulse signals including a multibit digital signal representing a time-changing count, a time-changing count of one series changing at a rate that is equal to a rate of change of a time-changing count of another series but changing at different times;

a respective comparator means associated with each recording element for comparing a multibit data signal with one of said counts and enabling the driving means associated with a respective recording element at a time controlled by said multibit data signal and said count of one series of digital pulse signals and disenabling said driving means associated with a respective recording element at a time controlled by a multibit data signal and the time-changing count of another series of digital pulse signals;

selection means associated with each respective comparator means for selecting, in response to a first selection signal, one of the two series of digital pulse signals being used by a respective comparator means to compare a count for enabling of a driving means associated with a respective recording element.

17. The printer apparatus of claim 15 or 16 and including means for altering a rate of changing of a count of one series of digital pulse signals in response to signals representing a color of an image being recorded.

18. The printer apparatus of claim 15 or 16 and wherein said selection means, in response to a second selection signal, selects one of the two series of digital pulse signals to be used by a respective comparator means to compare a count for disenabling of a driving means associated with a respective recording element.

* * * * *